(12) United States Patent
Ohishi

(10) Patent No.: US 6,649,240 B2
(45) Date of Patent: Nov. 18, 2003

(54) OPTICAL INFORMATION RECORDING MEDIUM

(75) Inventor: Takuo Ohishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/513,119

(22) Filed: Feb. 25, 2000

(65) Prior Publication Data

US 2002/0090485 A1 Jul. 11, 2002

(30) Foreign Application Priority Data

Feb. 26, 1999 (JP) .......................................... 11-051831

(51) Int. Cl.$^7$ ................................................. B32B 3/02
(52) U.S. Cl. ................. 428/64.1; 428/64.4; 430/270.11
(58) Field of Search ............................... 428/64.1, 64.2, 428/64.4, 64.6, 913; 430/270.11, 495.1, 945

(56) References Cited

U.S. PATENT DOCUMENTS

| 5,599,649 | A | | 2/1997 | Shinkai et al. | |
|---|---|---|---|---|---|
| 5,972,457 | A | * | 10/1999 | Matsuishi et al. | 428/64.1 |
| 6,084,603 | A | * | 7/2000 | Arai et al. | 347/2 |

FOREIGN PATENT DOCUMENTS

JP          10199038          7/1998

OTHER PUBLICATIONS

English Translation of Japanese Laid–Open Patent Application No. 10–199038, Jul. 31, 1998.

* cited by examiner

*Primary Examiner*—Elizabeth Mulvaney
(74) *Attorney, Agent, or Firm*—Cooper & Dunham LLP

(57) ABSTRACT

An optical information recording medium includes a transparent substrate on which a recording layer, a reflection layer, a hydrophobic protective layer, a hydrophobic intermediate layer, and an ink receiving layer are successively overlaid.

5 Claims, 1 Drawing Sheet

FIGURE
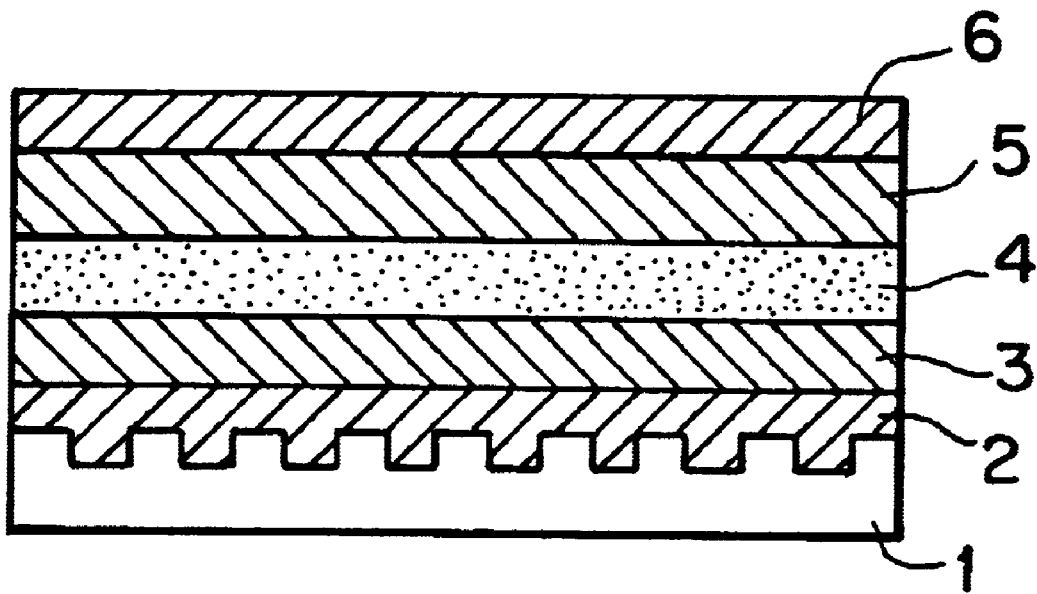

OPTICAL INFORMATION RECORDING MEDIUM

BACKGROUND OF THE INVENTION

1. Field of the Invention

The present invention relates to an optical information recording medium, and more particularly to an optical information recording medium comprising a transparent substrate such as a transparent disc on which a recording layer, a reflection layer, a hydrophobic protective layer, a hydrophobic intermediate layer, and an ink receiving layer are successively overlaid, on which ink receiving layer clear printing can be performed, using an ink, for instance, by means of ink jet printing or screen printing, regardless of the color of the ink employed.

2. Discussion of Background

Optical information recording media have been widely used in the fields of audio equipment, information processing and the like, as reproduction-only type optical information media or as write once read many type (WORM type) optical information media, such as CD, CD-R, DVD-R, DVD-ROM, CD-RW and OVD-RW.

These optical information recording media are composed of a transparent substrate made of a material such as glass or plastics, and an optical recording layer or a magneto-optical recording layer which is overlaid on the substrate.

Generally, in these optical information recording media, a recording layer, a reflection layer and a protective layer are successively formed and overlaid on a doughnut-shaped, transparent substrate disc by spin coating or sputtering.

The recording layer is generally a resin layer which contains an organic pigment such as a cyanine pigment or phthalocyanine pigment. Information is recorded on the recording layer, and recorded information is reproduced therefrom by applying a laser beam with a wavelength of 770 to 790 nm to the recording layer through the transparent substrate.

The reflection layer is generally formed on the recording layer, for example, by sputtering. The reflection layer is formed in the shape of a thin film, and is made of a metal, such as Au or Al, that can efficiently reflect the laser beam which has passed through the recording layer.

Furthermore, a protective layer made of a resin film is overlaid on the reflection layer in order to protect the recording layer and the reflection layer from physical or mechanical adverse effects produced, for example, by the substrate.

Generally, these optical recording media include an index display indicating the contents of recording as well as various designs for the optical recording media, which are printed an the surface of the protective layer. When a large number of the optical recording media is produced and therefore the index display and the various designs are mass printed, the printing is generally carried out by transfer printing, such as screen printing, pad printing, and offset printing.

In the case where the number of optical recording media made is relatively small, for example, as in the case of self-made CD, promotion CD, audition CD, or test CD, the contents of recording thereof could be reproduced and confirmed by means of a CD player, but the above-mentioned printing of the contents of recording will be more convenient and therefore is required. Furthermore, in accordance with the wide spread use of write-once type optical information recording media including CD-ROM for personal computers, the customer can make his or her own CD-ROMs, although the number is relatively small. For such customer's own CD-ROMs, there is a demand for printing the contents of recording.

Under such circumstances, it is required that the indexes indicating the contents of recording and other designs be on the surface of the protective layer or a printing surface of a label before or after information is recorded on the recording medium.

In accordance with the above-mentioned demand, for example, Japanese Laid-Open Patent Application 6-60432 proposes an optical information recording medium comprising (1) a protective layer, which is usually hydrophobic, and has been worked so as to have a roughened surface, and (2) a hydrophilic resin layer serving as a printing layer on which the above-mentioned printing can be performed, which is provided on the protective layer, whereby printing can be performed, using an aqueous ink, on the hydrophilic resin layer formed on the protective layer.

In the above proposal disclosed in Japanese Laid-Open Patent Application 6-60432, it is intended to perform printing on the hydrophilic resin layer serving as the printing layer, using an aqueous ink, since the protective layer is usually a hydrophobic resin layer which is not suitable for printing with the aqueous ink.

However, it is generally considered to be difficult to form the hydrophilic resin layer on the hydrophobic protective layer in close contact with one another in view of the repelling properties of the two layers like an oil and water. In other words, it is considered to be difficult to form a stable hydrophilic resin layer which serves as an image fixing layer for the aqueous ink on the hydrophobic protective layer.

As can be clearly noted from the above proposal, when the surface of the protective layer is subjected to surface-roughening working to improve the matching and adhesion between the protective layer and the hydrophilic layer, complicated steps are required to be conducted, such as coating a hydrophilic resin on the protective layer before the protective layer is completely cured.

Furthermore, in the above proposal, even if the printing has been carried out using the aqueous ink, the complicated steps such as subjecting the protective layer to the above-mentioned surface-roughening treatment and forming the hydrophilic resin layer on the hydrophobic surface of the protective layer are required to be conducted, but there remains a problem in the adhesion between the protective layer and the hydrophilic layer. In short, a sufficiently stable ink fixing layer for use in practice has not yet been proposed.

SUMMARY OF THE INVENTION

It is therefore an object of the present invention to provide an optical information recording medium which can be produced without the above-mentioned complicated steps, on which various information and various designs can be easily and clearly printed, using an oil ink, without any restriction on the kind of color of the ink used, and also without being effected by the background color of a reflection layer used in the optical information recording medium.

The above object of the present invention can be achieved by an optical information recording medium comprising (1) a transparent substrate, (2) a recording layer provided on the transparent substrate, (3) a reflection layer provided on the recording layer, (4) a hydrophobic protective layer provided on the reflection layer, (5) a hydrophobic intermediate layer provided on the hydrophobic protective layer, and (6) an ink receiving layer provided on the hydrophobic intermediate layer.

It is preferable that the intermediate layer work to conceal the color of the reflection layer in order that the information and designs printed are not effected by the background color of the reflection layer of the optical information recording medium.

In the above optical information recording medium, it is preferable that the intermediate layer have a thickness of 30 µm or less.

In the above optical information recording medium, the intermediate layer may be in the shape of a single layer, and comprise at least one resin of a ultraviolet-curing resin or a thermosetting resin.

Furthermore, in the above optical information recording medium, the intermediate layer may also be in the shape of a composite layer comprising a plurality of overlaid layers, each layer comprising at least one resin of a ultraviolet-curing resin or a thermosetting resin.

Furthermore, in the optical information recording medium, it is preferable that the intermediate layer have a surface hardness of HB or more in terms of pencil hardness.

It is also preferable that the ink receiving layer have a surface hardness of HB or more in terms of pencil hardness.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGURE is a schematic cross-sectional view of an example of the optical information recording medium of the present invention.

DESCRIPTION OF THE PREFERRED EMBODIMENTS

With reference to FIGURE, an example of the optical information recording medium of the present invention will now be explained.

Reference numeral 1 indicates a transparent substrate. On the transparent substrate 1, there is overlaid a recording layer 2. On the recording layer 2, there is overlaid a reflection layer 3 which may be made of, for example, a metal such as Au, Ag, Al, Cu Cr or Ni, and an alloy of any of such a metal. On the reflection layer 3, there is overlaid a hydrophobic protective layer 4. On the hydrophobic protective layer 4, there is overlaid a hydrophobic intermediate layer 5, which may comprises, for example, a hydrophobic resin, when necessary with the addition of a coloring agent thereto.

On the intermediate layer 5, there is overlaid an ink receiving layer 6.

In the present invention, since both the protective layer 4 and the intermediate layer 5 are hydrophobic, the intermediate layer 5 can be formed in a stable manner by a conventional film formation method on the protective layer 4 in close contact therewith, with excellent matching, without the protective layer 4 being subjected to any prior processing, so that even when the optical information recording medium of the present invention is exposed to air for an extended period of time, no moisture is absorbed by the intermediate layer 5 and the color tone of the intermediate layer 5 does not deteriorate, with high resistance to moisture.

Because of the above-mentioned overlaid layer-structure of the hydrophobic protective layer 4, the hydrophobic intermediate layer 5 and the ink receiving layer 6, for example, when printing is performed with an ink on the ink receiving layer 6, for instance, using an ink jet printer, a coloring component of the ink forms a printed image on the intermediate layer 5.

Furthermore, the reflection layer 3 is covered with the protective layer 4 and also with the intermediate layer 5, so that the background color of the reflection layer 3 is concealed by the protective layer 4 or the intermediate layer 5 or both of the layers 4 and 5.

Furthermore, there is provided only the ink receiving layer 6 on the intermediate layer 5, so that the printed image are clearly visible. Furthermore, the ink receiving layer 6 also serves as a protective layer for the intermediate layer 6, so that the printed image on the intermediate layer 5 is protected from direct light irradiation or direct mechanical scratches and therefore the printed image has excellent durability.

It is preferable that the intermediate layer 5 have a thickness of 30 µm or less, more preferably in the range of 2 µm to 30 µm, furthermore preferably in the range of 5 µm to 20 µm. Since the intermediate layer 5 is a relatively thin film layer as mentioned above, the formation of the intermediate layer 5 will not cause such problems that shrinkage stress is applied to the substrate 1 during the setting of the hydrophobic resin in the intermediate layer 5 and that a curvature is formed in the substrate 1 in its entirety.

In the present invention, it is preferable that the intermediate layer 5 be either in the form of a single layer or in the form of a plurality of overlaid layers and that each layer comprise at least one resin of an ultraviolet-curing resin oz a thermosetting resin as the hydrophobic resin. Of an ultraviolet-curing resin or a thermosetting resin, the ultraviolet-curing resin (hereinafter referred to as UV-curing resin) is more preferable for use in the intermediate layer 5 of the present invention.

As mentioned above, the reflection layer 3, which is made of the above-mentioned metal or alloy, is covered with the protective layer 4. However, the reflection layer 3 is a thin layer with a thickness of about several nm which can be made usually by sputtering, so that the reflection layer 3 is liable to retain thermal stress therein.

In order to avoid the, retaining the thermal stress applied to the reflection layer 3, it is more preferable to use the UV-curing resin in the intermediate layer 5, which can be cured with radiation of ultraviolet light than the thermosetting resin which is cured at a relatively high temperature.

As the UV-curing resin, there can be employed conventionally known ultraviolet-curing resins such as N-vinyl pyrrolidone, tripropylene glycol diacrylate, trimethylol propane triacrylate, and hexane diol diacrylate.

In addition to the above, resins that can be thermally cross-linked, without being limited to the above-mentioned ultraviolet radiation, such as epoxy resin and urethane resin, can also be employed, Furthermore, there can be used such resins that can be obtained by using a dialkoxysilane coupling agent which initiates polymerization in the presence of water in air. Main chains and side chains of the thus obtained cross-linked product may include either saturated or unsaturated straight-chain hydrocarbon moieties, or cyclic compound moieties such as melamine and bisphenol moieties.

These main chains and side chains may also include therein a bond with (1) a polyether containing at least one ether bond, (2) a polyester containing an ester bond, (3) a polyurethane containing a urethane bond, (4) an ionomer containing an ionic bond, (5) a polyamide containing an amide bond or (6) a polyamide containing an imide bond, (7) polysulfone or (8) polysulfide.

For improvement of the humidity resistance of these cross-linked products, the side chains may include a fluorocarbon moiety. The side chains may also contain an epoxy resin moiety serving as a halogen scavenger.

The coated layers may also contain an additive or additives such as a plasticizer, an antioxidant and an antistatic agent to stabilize the coated layers.

When the resin in the intermediate layer 5 is cured, if the shrinkage ratio of the resin is lowered, the occurrence of the distortion of the cured resin and the cracking thereof can be prevented, so that it is preferable that the shrinkage ratio be 12% or less, more preferably 8% or less.

The intermediate layer 5 may be such a cured layer that can be produced by the steps comprising coating an organic monomer or oligomer, cross-linking and curing the coated organic monomer or oligomer with UV irradiation or the like thereto.

For preparation of the intermediate layer 5 comprising such an organic polymer, it is preferable that the conventional UV-curing resin be employed, since the UV-curing resin can be prepared, without causing any adverse effects on the substrate 1, the recording layer 2 and other layers, by the steps of adding an initiator, a reaction catalyst and a solvent such as MEK or alcohol to a mixture of a monomer and an oligomer, each containing at least one reactive acryloyl group per molecule thereof, and subjecting the reaction mixture to cross-linking polymerization with UV irradiation.

With reference to FIGURE, the intermediate layer 5 made of the UV-cured resin can be provided on the reflection layer 3 via the protective layer 4 as shown in FIGURE, using a spin coating method or the like.

In this invention, it is preferable that the UV-curing resin prior to the coating thereof to form the intermediate layer 5 have a viscosity of 20 to 130 mPa·s at room temperature. It is also preferable that the intermediate layer 5 have a thickness of 2 to 8 µm, more preferably 4 to 6 µm.

For example, when the UV-curing resin has a viscosity of 28 mPa·s at room temperature, and the spin coating is carried out, with the number of revolution of a disc substrate with a diameter of 60 mm being set at 4000 rpm, the intermediate layer 5 with a uniform thickness of 3.5 to 4 µm can be formed. However, when the disc substrate with a diameter of 60 mm is replaced with a disc substrate with a diameter of 120 mm in the above, the formed intermediate layer has a thickness in the range of 3.5 to 5 µm in the direction of the diameter of the disc substrate. It is preferable that the number of revolution of the disc substrate for the spin coating be set at 6000 rpm, whereby even when the disc substrate with a diameter of 120 mm is employed, a intermediate layer made of the hydrophobic resin with a thickness of 2 to 3 µm in the direction of the diameter of the disc substrate can be formed.

In this invention, as mentioned above, the ink receiving layer 6 is provided on the intermediate layer 5, whereby the intermediate layer 5 and the ink receiving layer 6 constitute a printing layer. Thus, the side opposite to a reading-out laser beam incident side constitutes a printing side, so that when printing is performed on the printing side, that is, on the ink receiving layer 6, for example, by using an ink jet printer, a printed image is fixed on the ink receiving layer 6.

In the present invention, the surface of the ink receiving layer 6 may be either hydrophilic or hydrophobic. However, it is preferable that the ink receiving layer 6 be hydrophobic because the ink receiving layer 6 is formed on the hydrophobic intermediate layer 5. Therefore, it is preferable that the ink receiving layer 6 be prepared by using a hydrophobic resin. In this case, it is important that the ink receiving layer 6 made of a hydrophobic resin can easily receive, for instance, an oil ink, in other words, a printed image formed on the ink receiving layer 6 can easily and securely fixed to the surface of the ink receiving layer 6 and is difficult to be peeled away from the surface of the ink receiving layer 6 once the printed image is dried and fixed.

It is preferable that the intermediate layer 5 and the ink receiving layer 6 each have a surface hardness of HB or more in terms of pencil hardness determined by a pencil hardness test.

Thus, in addition to the above-mentioned printing, label information for the optical information recording medium and various necessary designs are printed on the ink receiving layer 6, so that it is preferable that the ink receiving layer 6 have or be provided with such properties that are suitable for printing and writing thereon. Furthermore, the ink receiving layer 6 also serves as a protective layer for the intermediate layer 5, the reflection layer 3, and the recording layer 2, which protective layer may be referred to as a second protective layer.

In order that the ink receiving layer 6 may perform the above-mentioned functions, it is preferable that finely-divided inorganic filler particles be contained in an amount of 1 to 15 wt. %, more preferably in an amount of 3 to 8 wt. % in the ink receiving layer 6. In particular, in order that the ink may be received by or fixed on the surface of the ink receiving layer 6, and that the ink may be prevented from spreading, and further that multi-color printing may be performed, there can be employed, for example, conventionally known finely-divided inorganic white fillers, such as amorphous silica or white carbon, titanium dioxide, calcium carbonate, talc, kaolin, and clay, although the particle diameter, shape, oil absorption, and whiteness thereof are taken into consideration.

The ink receiving layer 6 can be formed, for example, by a coating method, such as the spin coating method, or the screen printing method, although the method is not limited to any particular method. However, from the viewpoints of controlling the thickness of the ink receiving layer 6 and the production efficiency therefor, the screen printing method is preferably employed.

It is also preferable that an acrylic or epoxy-based UV-curing resin be employed as a coating resin for the ink receiving layer 6 in order that the ink receiving layer 6 may function as the protective layer with the necessary strength therefor as mentioned above. When necessary, a photoreactive monomer which serves as a viscosity controlling agent can be added to the UV-curing resin prior to the coating thereof, and then the UV-curing resin can be cured with UV irradiation.

As the material for the transparent substrate 1, it is preferable to use a resin with high transparency and excellent mechanical strength, especially with excellent impact, and also with a refractive index of 1.4 to 1.6 with respect to laser beam, such as polycarbonate, polypropylene, polyacrylate and methyl methacrylate. The transparent substrate 1 is usually in the form of a disc, which is molded, for example, by injection molding, provided with a spiral guide groove on the surface thereof. A transparent glass substrate can also be employed as the transparent substrate 1.

The optical information recording medium of the present invention comprises a recording layer on which information which can optically be read by use of a laser beam is recorded, and from which the recorded information can be reproduced. The recording and reproduction can be carried out either by an optical method or by a magneto-optical recording and reproduction method.

The recording and reproduction are effected through the transparent substrate 1. When the laser beam is used for the above-mentioned recording and reproduction, laser beams with a wavelength in the range of 770 to 830 nm are generally employed.

Other features of this invention will become apparent in the course of the following description of an exemplary embodiment, which is given for illustration of the invention and is not intended to be limiting thereof.

EXAMPLE 1

With reference to FIGURE, a solution of an organic phthalocyanine pigment was coated by spin coating on a disc substrate 1 made of polycarbonate, with a continuous groove with a pitch of 1.6, and dried, whereby a recording layer 2 was formed on the disc substrate 1.

An Ag reflection layer 3 with a minimum film thickness of 70 nm was then formed on the recording layer 2 in a recording area of the disc subrate by a conventional sputtering method using an Ag target with a purity of 99.9%.

A protective layer 4 made of a UV-caring resin, with a thickness of 5 μm, was formed on the reflection layer 3.

A intermediate layer 5 was then formed on the protective layer 4 by spin coating, using a commercially available UV-curing resin (Trademark "SD318" made by Dai-Nippon Ink and Chemicals, Inc) having a viscosity of 128 mPa·s at room temperature, under the conditions that a solution of the UV-curing resin was trickled dropwise on a central portion of a disc which was rotating at 60 rpm, followed by rotating the disc at 6000 rpm for 3 seconds, and the UV-curing resin was cured with UV irradiation.

The thickness of the thus formed intermediate layer 5 was then measured by using a commercially available microscope spectrophotometer (Trademark "TFM-120 type", made by ORC Manufacturing Co., Ltd.). The result was that when the spin coating was being conducted at the number of revolution of 6000 rpm, the intermediate layer 5 had an average thickness of 7.3 μm with a dispersion of 7±1 μm in the radius direction of the disc substrate 1, and had a thickness of 7.6 μm at a distance of 40 mm in the direction of radius in the central portion of the recording area thereof.

An ink receiving layer 6 was then formed on the intermediate layer 5 by conducting screen printing of a UV-curing resin ink containing therein an amorphous silica serving as a filler, and curing the printed UV-curing resin ink with UV irradiation, whereby an optical information recording medium of the present invention was fabricated.

Japanese Patent Application No. 11-051831 filed Feb. 26, 1999 is hereby incorporated by reference.

What is claimed:

1. An optical information recording medium comprising:
    a transparent substrate,
    a recording layer provided on said transparent substrate,
    a reflection layer provided on said recording layer,
    a hydrophobic protective layer provided on said reflection layer,
    a hydrophobic intermediate layer provided on said hydrophobic protective layer, said intermediate layer having a surface hardness of HB or more in terms of pencil hardness, and
    an ink receiving layer provided on said hydrophobic intermediate layer.

2. The optical information recording medium as claimed in claim 1, wherein said intermediate layer has a thickness of 30 μm or less.

3. The optical information recording medium as claimed in claim 1, wherein said intermediate layer is in the shape of a single layer, and comprises at least one resin of a ultraviolet-curing resin or a thermosetting resin.

4. The optical information recording medium as claimed in claim 1, wherein said intermediate layer is in the shape of a composite layer comprising a plurality of overlaid layers, each layer comprising at least one resin of a ultraviolet-curing rein, or a thermosetting resin.

5. The optical information recording medium as claimed in claim 1, wherein said ink receiving layer has a surface hardness of HB or more in terms of pencil hardness.

* * * * *